L. H. DES ISLES.
CONDUIT FOR THERMOTEMPERATURE CIRCUITS OF GRAIN TANKS.
APPLICATION FILED JULY 6, 1918.
1,438,751.
Patented Dec. 12, 1922.
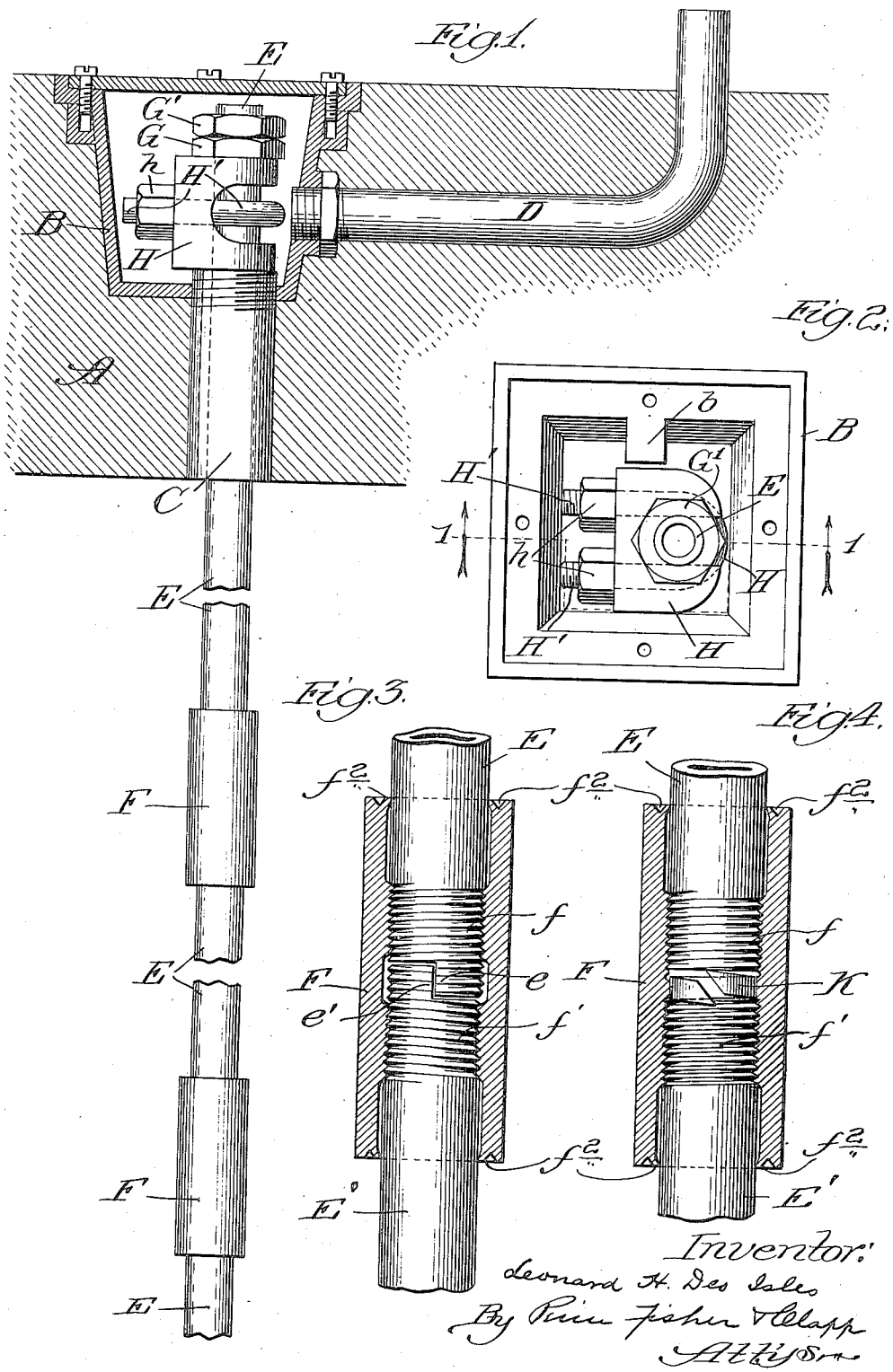

Patented Dec. 12, 1922.

1,438,751

UNITED STATES PATENT OFFICE.

LEONARD H. DES ISLES, OF CHICAGO, ILLINOIS.

CONDUIT FOR THERMOTEMPERATURE CIRCUITS OF GRAIN TANKS.

Application filed July 6, 1918. Serial No. 243,605.

*To all whom it may concern:*

Be it known that I, LEONARD H. DES ISLES, a citizen of the United States, residing in Chicago, county of Cook, and State of Illinois, have invented certain new and useful Improvements in Conduits for Thermotemperature Circuits of Grain Tanks, of which I do declare the following to be a full, clear, and exact description, reference being had to the accompanying drawing, forming a part of this specification.

The present invention has for its object to provide an improved conduit and means for supporting the same, more especially designed for carrying the wires and thermal couplings of thermotemperature systems such as are used in grain tanks or bins to enable the temperature of the bins to be quickly ascertained at a central point or station. In practice, it is found that the downward movement of the grain in the tall tanks or bins in which are contained the conduits for the thermal couplings has a tendency to disconnect or loosen the sections of the pipe of which the conduit is formed, as the stress of the grain frequently tends to bend the conduit and in its downward movement frequently takes more or less of a circular or spiral course tending to uncouple the pipe sections of the conduit. Conduits of this character are usually of considerable length (frequently as great as 100 feet) and are suspended from the tops of the tanks, the lower ends of the conduits being free to sway more or less under the movement of the grain. My invention contemplates provision of a conduit of the character mentioned which, while being free to yield or sway somewhat under the pressure and movement of the grain, shall be incapable of bodily rotation and shall have the pipe sections of which it is formed so coupled together as to be incapable of independent rotation that might tend to loosen or disconnect the sections.

The invention consists in the novel features of construction hereinafter described, illustrated in the accompanying drawing and particularly pointed out in the claims at the end of this specification.

Figure 1 is a view in elevation, parts being shown in section, illustrating a portion of a grain tank with my improved invention applied thereto. Figure 2 is a plan view showing the manner of supporting the conduit from the top of the tank. Figure 3 is an enlarged view in vertical section through adjoining pipe sections and the coupling uniting the same. Figure 4 is a view similar to Fig. 3 but showing a modified form of the invention.

The top A of the grain tank or bin has embedded therein a casing or suspension box B from the top of which there is a sleeve or thimble C passing through the top A of the tank, and as shown, a pipe section D for the passage of electric wires connects with the box or casing B and extends outside the top A of the tank.

My improved conduit is shown as formed of a plurality of pipe sections E, E' of suitable number according to the length of the conduit, these pipe sections E and E' being connected together by couplings F. In the form of the invention illustrated in Fig. 1 of the drawings, the pipe sections E and E' are formed respectively with right and left hand screw threads and the interior of the coupling F is formed with corresponding right and left hand threads $f$ and $f'$. In this form of my invention, the adjacent ends of the pipe sections E and E' are suitably shaped so that when brought together they will interlock, one simple manner of accomplishing this interlocking of the sections E and E' being by cutting away a portion of the section so as to leave the interlocking parts $e$ and $e'$. When the sections E and E' are to be joined together, their threaded ends will be advanced within the coupling F until they engage the correspondingly threaded portions of the coupling, after which, by turning the coupling, the inner ends of the pipe sections will be brought together until they interlock, as shown in Fig. 3 of the drawing. Preferably, the end portions of the coupling F are left unthreaded for a distance and such unthreaded portions of the coupling are of slightly greater diameter than the exterior diameter of the pipe sections E and E', the purpose of this construction being to enable the end portions of the coupling to bear against the pipe sections at a distance from the screw threads, so that danger of breaking or cracking the conduit at the threaded portions is avoided. It will be seen that when the sections E and E' of the conduit are joined together by the coupling F, all danger of the independent rotation of the sections E and E' is avoided and hence the loosening or disconnection of the sections is prevented. In order to more effectively guard against the disconnection of the sections E and E' and prevent any accidental rotation of the coupling F, I prefer, after the coupling is in position for use, to upset or swage, as at $f^2$, the extreme ends of the coupling so that these parts shall bear securely against the walls of the pipe sections E and E'.

The upper portion of the uppermost pipe section E of the conduit passes freely through the sleeve or thimble C and its end is threaded to receive a nut G and a lock nut G'. The conduit is suspended by means of a yoke H on which the nut G rests and through this yoke pass the ends of a U-shaped coupling bolt H', the threaded ends of the bolt H' being engaged by correspondingly threaded nuts $h$. By tightening the nuts $h$, the upper end portion of the pipe section E can be firmly clamped between the U-shaped bolt H' and the yoke H. The yoke H may rest upon the upper end of the sleeve or thimble C or upon the bottom of the box or casing B. When the yoke H and bolt H' are firmly united to the upper end of the pipe section E, it will hold the conduit against bodily rotation, as any tendency of the yoke H to turn within the casing B is resisted by the contact of the yoke with a part such as $b$ projecting inwardly from the wall of the box or casing B.

From the foregoing description, it will be seen that when the sections of the conduit have been joined together by the couplings F and the conduit has been suspended by the means above described, the conduit is free to sway or yield under the stress of the movement of the grain, but inasmuch as the conduit is firmly held against bodily rotation and its sections are held against independent rotation, all danger of the loosening of the sections of the conduit and all strains or injury to the wires that will be carried thereby will be avoided.

It is obvious that the precise means hereinbefore described for suspending the conduit and preventing the independent rotation of its sections, may be modified without departing from the scope of the invention. Thus, in Figure 4 of the drawings, I have illustrated a modified means for coupling the pipe sections of the conduit to prevent their independent rotation. In this form of the invention, the coupling F is formed upon its interior with right hand screw threads $f$, $f^3$ adapted to receive the ends of the pipe sections which would be formed with corresponding threads. In this form of the invention, an independent locking device, preferably in the form of a split ring K, will be placed centrally within the coupling F between the ends of the pipe sections. The split ring K will have its ends normally offset and the ring will be formed of spring steel or like hard and resilient metal, and preferably, the ends of the ring will form chisel points adapted to indent or embed themselves in the ends of the pipe sections when the pipe sections are drawn together by the coupling. When the pipe sections have been drawn together, the pointed ends of the rings K will serve to interlock the ends of the pipe sections and prevent their independent rotation and separation. In this form of the invention, as in that hereinbefore described, the ends of the coupling F are preferably upset, as at $f^2$, for the purpose hereinbefore stated.

Having thus described my invention, what I claim as new and desire to secure by Letters Patent is:—

1. A vertical electric wire conduit for grain tanks and the like formed of a plurality of pipe sections, means uniting said sections and positively securing the same against independent rotation, and means at the upper end of the conduit to suspend the same and hold it against bodily rotation.

2. A vertical electric wire conduit for grain tanks and the like formed of a plurality of pipe sections, couplings uniting said sections and positively securing the same against independent rotation, and devices engaging the upper end of said conduit for suspending the same in a manner free to sway and for holding it against bodily rotation.

3. A vertical electric wire conduit for grain tanks and the like adapted to be suspended at its upper end in a manner free to sway and formed of a plurality of pipe sections, couplings threaded upon the adjacent ends of said sections for uniting the same, and means within said couplings for holding the pipe sections against independent rotation, the end portions of said couplings being unthreaded and upset or swaged to engage the pipe sections.

4. The combination of a grain tank having a suspension box or casing at its top, of a conduit for electric wires having its upper end extended into said box or casing, a two-part clamping device within said box or casing rigidly secured to the upper end of said conduit and suspending the same in a manner free to sway, and means within said box or casing for engaging said clamping device to guard the same and said conduit against rotation.

5. The combination of a grain tank having a suspension box or casing in its top, of a conduit for electric wires having its upper end extended into said box or casing, a clamping device rigidly secured to said conduit within said box or casing and comprising two members adjustable with respect to each other, and means within said box or casing to prevent the rotation of said clamping device and said conduit.

6. The combination with a grain tank having a suspension box or casing in its top, of a conduit for electric wires having its upper end extended into said box or casing, and a clamping device within said box or casing, said clamping device comprising two members adjustable with respect to each other for engaging the upper end of the conduit.

7. A vertical electric wire conduit for grain tanks and the like comprising a suspension box, a vertical pipe extending loosely into said box, a two-part clamping device within said box rigidly secured to the upper end of said pipe, an abutment fixed to said pipe and engaging said clamping device, and means in said box for holding said clamping device and pipe against rotation.

LEONARD H. DES ISLES.